US010627039B2

(12) United States Patent
Morrow

(10) Patent No.: US 10,627,039 B2
(45) Date of Patent: Apr. 21, 2020

(54) MULTI-DIAMETER FOAM PIG

(71) Applicant: TDW DELAWARE, INC., Wilmington, DE (US)

(72) Inventor: John R. Morrow, Tulsa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 0 days.

(21) Appl. No.: 15/745,840

(22) PCT Filed: Jun. 26, 2017

(86) PCT No.: PCT/US2017/039309
§ 371 (c)(1),
(2) Date: Jan. 18, 2018

(87) PCT Pub. No.: WO2017/223567
PCT Pub. Date: Dec. 28, 2017

(65) Prior Publication Data

US 2019/0113170 A1 Apr. 18, 2019

Related U.S. Application Data

(60) Provisional application No. 62/354,560, filed on Jun. 24, 2016.

(51) Int. Cl.

| | |
|---|---|
| ***F16L 55/40*** | (2006.01) |
| ***B08B 9/055*** | (2006.01) |
| ***F16L 55/44*** | (2006.01) |
| *F16L 101/10* | (2006.01) |
| *F16L 101/12* | (2006.01) |

(52) U.S. Cl.
CPC ............ *F16L 55/40* (2013.01); *B08B 9/0553* (2013.01); *F16L 55/44* (2013.01); *F16L 2101/10* (2013.01); *F16L 2101/12* (2013.01)

(58) Field of Classification Search
CPC ........ B08B 9/055; B08B 9/0553; F16L 55/26; F16L 55/40; F16L 55/44; F16L 2101/10; F16L 2101/12
USPC ........................................ 15/104.061, 104.19
See application file for complete search history.

(56) References Cited

U.S. PATENT DOCUMENTS 1,855,646 A * 4/1932 Oberhuber ............ B08B 9/0553 15/104.061
2,653,334 A * 9/1953 Bay ......................... B08B 9/045 15/104.14
3,543,323 A 12/1970 Girard
(Continued)

*Primary Examiner* — Laura C Guidotti
(74) *Attorney, Agent, or Firm* — Gable Gotwals

(57) ABSTRACT

Embodiments of a multi-diameter foam pig include a first set of radially spaced-apart, longitudinally extending, slots located toward a nose end of the pig and a second set of radially spaced-apart, longitudinally extending, slots located toward a tail end. Each set of slots ends at a band section of the pig so that, together, the two sets of slots do not traverse the entire length of the pig. A standard-length unit version of the foam pig includes only the first set of slots. A set of shorter, intermediate slots, offset in a circumferential direction from the first and second set of slots and partially overlapping those slots, may be included on the band section. Because of the slots, and because of open cell foam, the foam pig decreases or increases in diameter as it enters a different diameter run than the run just traveled.

19 Claims, 4 Drawing Sheets

15B 41B 11B 41A 15A 11A 10 21 18 31 13

(56) References Cited

U.S. PATENT DOCUMENTS

| | | | | |
|---|---|---|---|---|
| 3,725,968 | A * | 4/1973 | Knapp | B08B 9/0553 15/104.061 |
| 4,122,575 | A | 10/1978 | Sagawa | |
| 4,498,932 | A | 2/1985 | Kruka | |
| 4,797,239 | A | 1/1989 | Cho | |
| 5,295,279 | A | 3/1994 | Cooper | |

* cited by examiner

MULTI-DIAMETER FOAM PIG

CROSS-REFERENCE TO RELATED APPLICATIONS

This application is the United States National Phase of Patent Application No. PCT/US2017/039309 filed 26 Jun. 2017, which claims priority to U.S. Provisional Application No. 62/354,560 filed 24 Jun. 2016 each of which are incorporated herein by reference.

BACKGROUND

This disclosure relates to pigs used in pipeline applications and, more particularly, to foam pigs of medium to high density weight. Because many pipelines include sections or runs having a different pipeline diameter than that of other runs, a need exists for a foam pig that can traverse multi-diameter pipelines and pipeline accessories that are pig-able such as wyes, tees, reducers and valves.

SUMMARY

Embodiments of a long-length unit version of a multi-diameter foam pig include a first set of radially spaced-apart, longitudinally extending, slots located toward a nose end of the pig and a second set of radially spaced-apart, longitudinally extending, slots located toward a tail end of the pig. Each set of slots ends at banded section of the pig so that, together, the two sets of slots do not traverse the entire length of the pig. A standard-length unit version of the foam pig includes only the first set of slots which end at the first band, and may include a set of intermediate shorter slots offset from the first set that extend, at least partially, into the band. Because of the slots, and because of the open cell foam, the foam pig decreases or increases in diameter as it enters a different diameter run than the run just traveled yet still moves forward under differential pressure through this different diameter run while engaging the pipeline wall. The pig can squeeze down to a minimum diameter of about half that of its maximum diameter and then return to its maximum diameter size.

ELEMENTS AND NUMBERING USED IN THE DRAWINGS AND DETAILED DESCRIPTION

Figure 2:
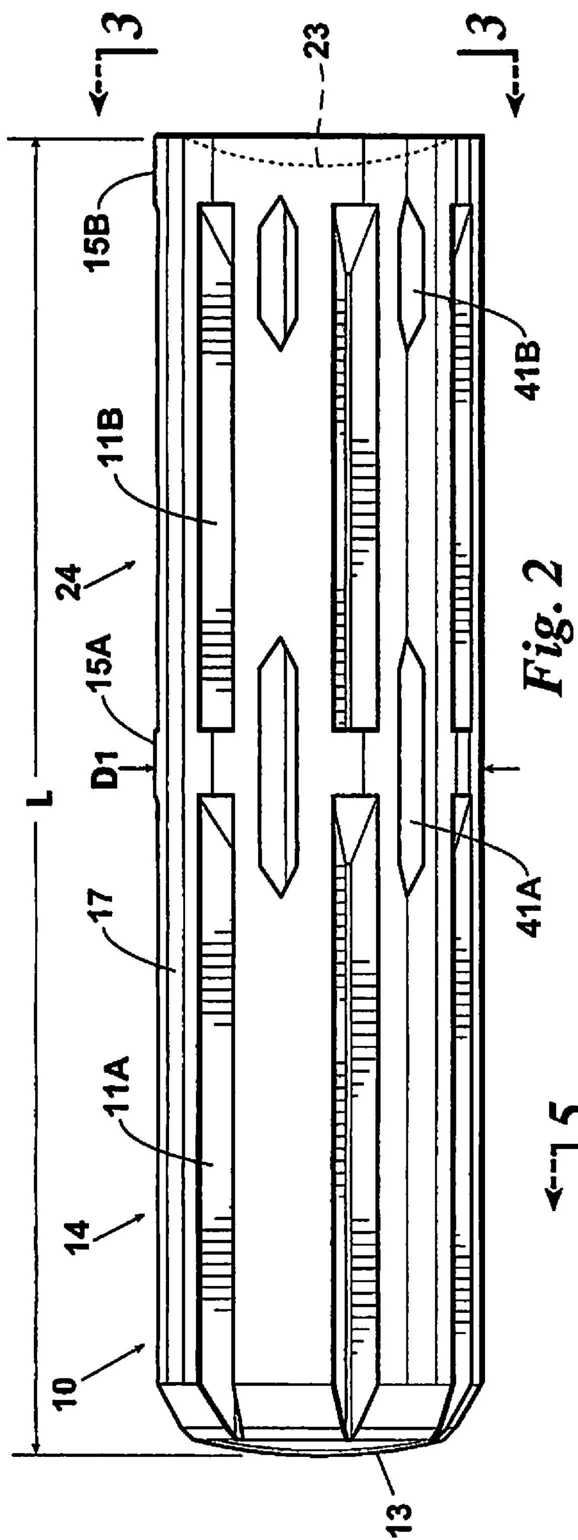
FIG. 2 is a front elevation view of an embodiment of a long-length unit version of a multi-diameter foam pig. A standard-length version of the foam pig includes only the first set of slots and the first band. Another set of slots, located on the band, may be offset from this first set.
Figure 3:
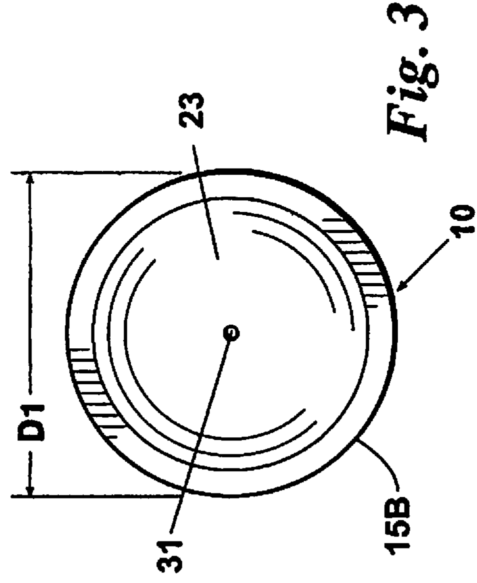
FIG. 3 is a right side (tail end) elevation view.
Figure 1:
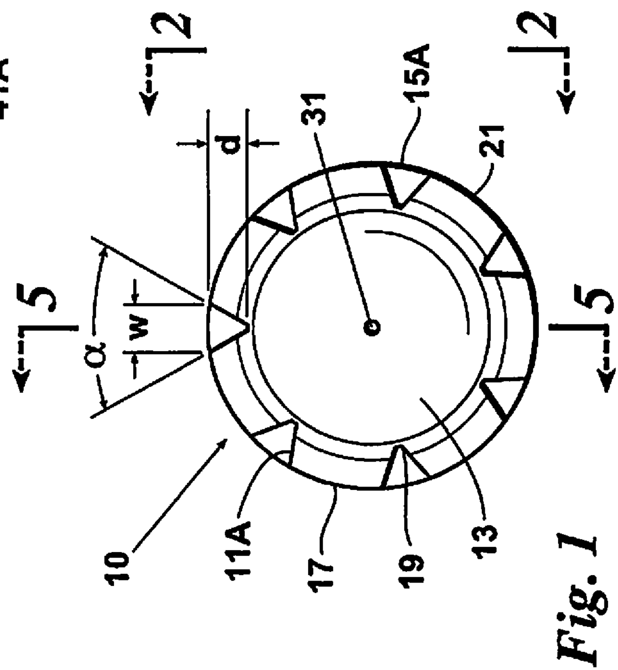
FIG. 1 is a left side (nose end) elevation view.
Figure 4:
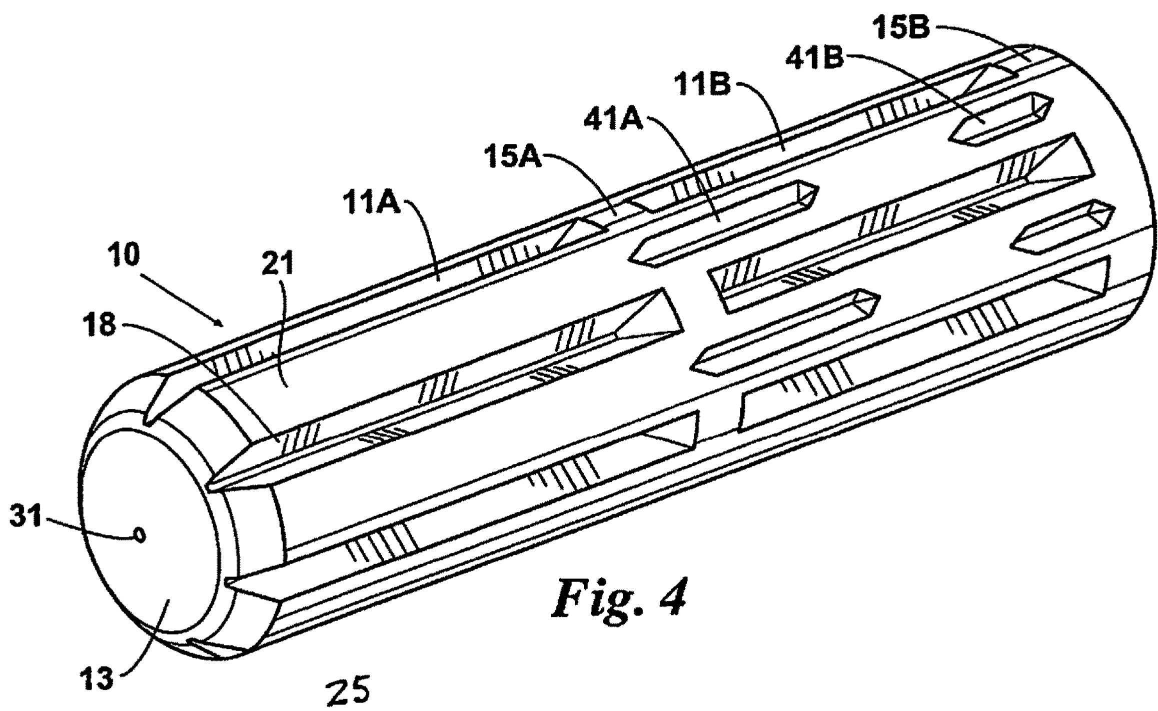
FIG. 4 is an isometric view.
Figure 5:
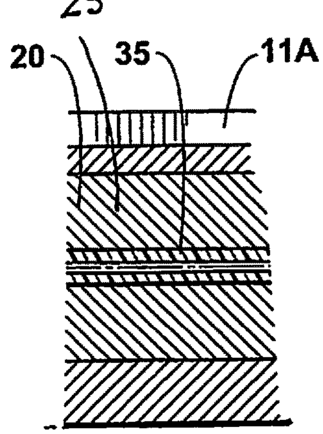
FIG. 5 is a view taken along section line 5-5 of FIG. 1. Embodiments may include a reinforcing rod through, and spacers in between, the core sections.
Figure 6:
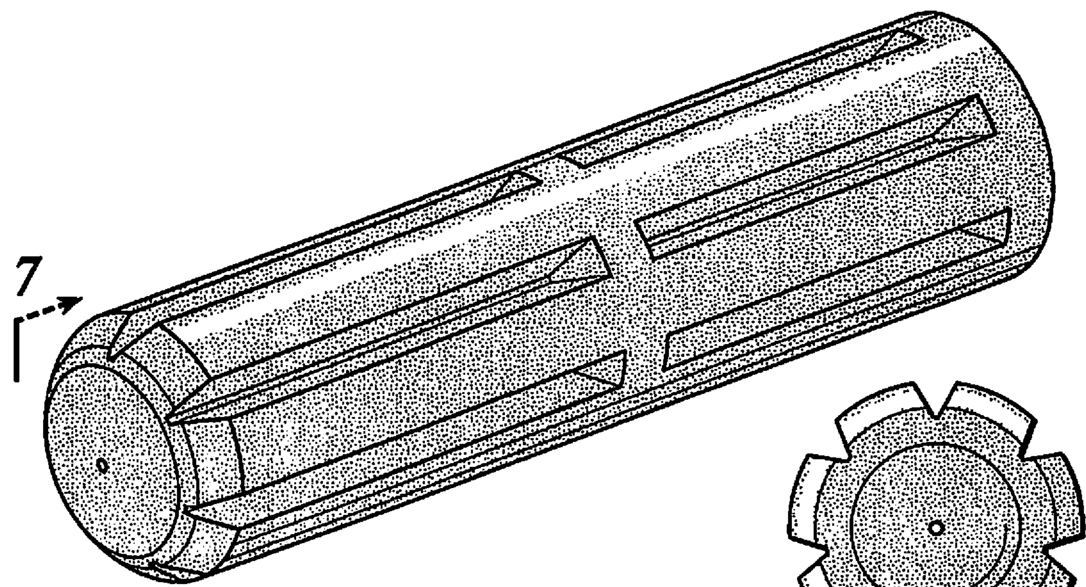
FIG. 6 is an isometric view of an embodiment illustrating the slots in a fully open position.
Figure 7:
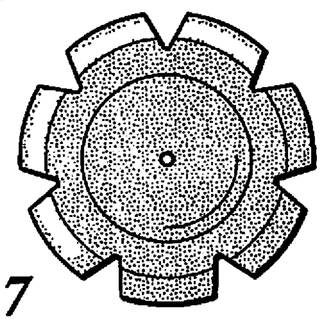
FIG. 7 is a view taken along section line 7-7 of FIG. 6.
Figure 8:
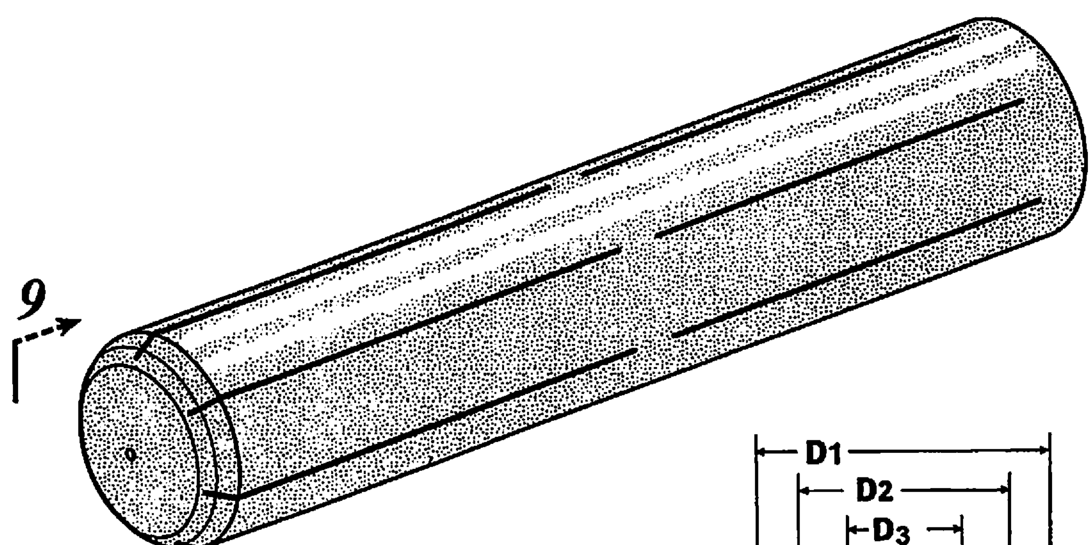
FIG. 8 is an isometric view illustrating the slots in a fully closed position.
Figure 9:
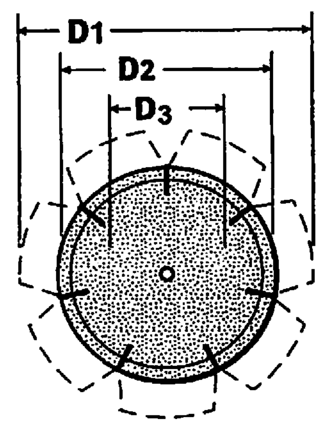
FIG. 9 is a view taken along section line 9-9 of FIG. 6. The pig may compress from a maximum diameter D1 to a minimum diameter D3.
Figure 10:
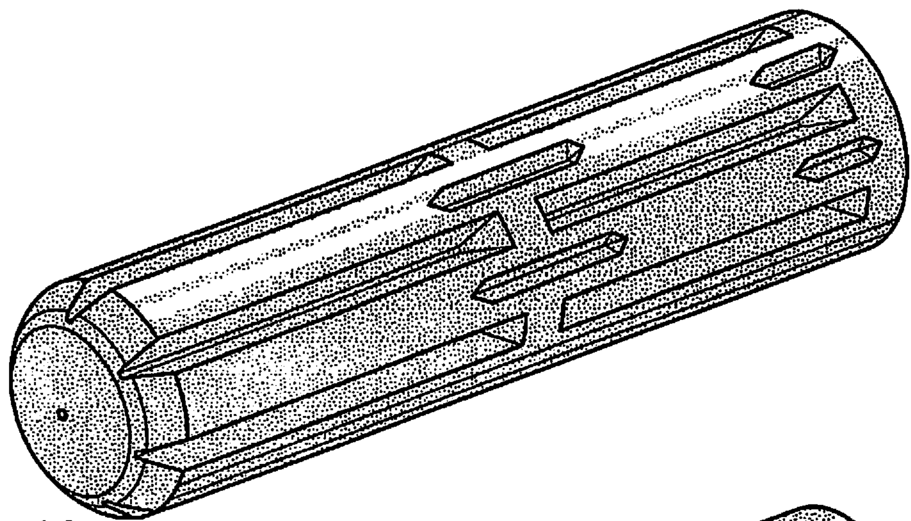
FIG. 10 is an isometric view of an embodiment illustrating the slots in a fully open position.
Figure 11:
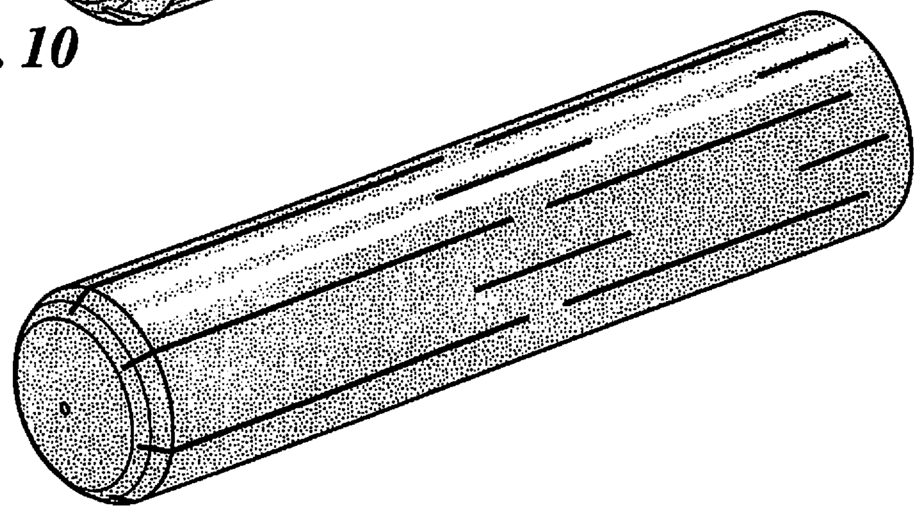
FIG. 11 is an isometric view illustrating the slots in a fully closed position.
Figure 12:
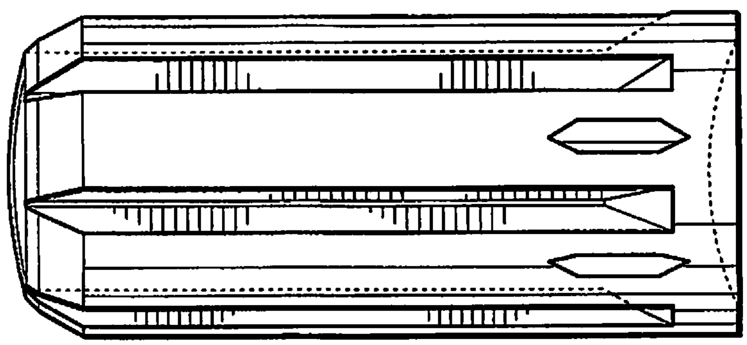
FIG. 12 is a front elevation view of an embodiment of a standard-length unit version of a multi-diameter foam pig. The pig also may include the intermediate slots toward its tail end like those shown, for example, in FIG. 2.

10 Foam pig
11 Slots (11A first set, 11B second set)
13 Nose end
14 First or forward half
15 Circumferential band (15A first band, 15B second band)
17 Outer circumferential (body) surface
18 Top (open) end of slots
19 Bottom (closed) end of slots
20 Core or core section
21 Skin
23 Tail end
24 Second or rearward half
25 Foam surrounding 20
31 Bypass flow passageway
33 Central longitudinal axis
35 Reinforcement tube
37 Spacer
41 Intermediate, shorter slots (41A on band 15A, 41B on band 15B)
D1 first (maximum) diameter
D2 second (smaller) diameter
D3 third (minimum) diameter
L length of 10
w width of 11
d depth of 11

Definitions

Density—following generally accepted foam pig manufacturing industry standards, low density is 1 to 2 lbs/ft$^2$ [4.88 to 9.77 kg/m$^2$], medium density is 5 to 7 lbs/ft$^2$ [24.42 to 34.19 kg/m$^2$], and high density is 8 to 10 lbs/ft$^2$ [39.07 to 48.04 kg/m$^2$].

Standard-length unit—a pig length equal to twice the pipeline diameter (e.g., a standard-length foam pig for a 16-inch diameter pipe [40.64 cm] is 32 inches [8 81.28 cm]).

Long-length unit—a pig length greater than twice the pipeline diameter (e.g. a long length foam pig for a 16-inch diameter pipe is 64 inches [162.56 cm]). A long-length unit can traverse certain pipeline accessories such as wyes that a standard-length unit cannot.

Multi-diameter—more than two pipeline diameters.

DETAILED DESCRIPTION

Embodiments of a foam pig according to this disclosure may traverse multiple pipeline diameters, for example, from a maximum inside diameter of 8 inches to a minimum of 4 inches [20.32 to 10.16 cm], 11 to 6 inches [27.94 to 15.24 cm], or 17 to 9 inches sizes [43.18 to 22.86 cm]. In embodiments, the foam pig includes a first set of slots located about a body of the foam pig between a nosed end and first circumferential band located toward the tail end of the pig. Each slot of the set tapers from a top end to a bottom end of the slot, extends longitudinally, is radially spaced-apart from the other slots of the set, and has an open position and a closed position. In some embodiments, the foam pig is extended in length and includes a second set of slots like those of the first set. This second set of slots is aligned with the first set and is located between the first circumferential band and a second circumferential band located toward the tail end of the foam pig. The foam pig may include a bypass flow passageway arranged coaxial to a central longitudinal axis of the pig.

When the slots are in a fully open position, the foam pig has a first diameter D1. When the slots are in a fully closed position the foam pig has a smaller diameter D2. The slots may be trapezoidal-shaped or triangular-shaped in cross-section. Because the foam pig makes use of open cell foam, the pig may compress further to a minimum diameter D3. A ratio of D1-to-D3 may be 2-to-1 or D3=0.5 D1. In other embodiments, D3=X*D1 where X is in a range of 0.33 to 0.67. In other embodiments of the foam pig, a set of intermediate shorter slots is located at least partially on the circumferential band, spaced between the first or second set of slots in a radial or circumferential direction, and partially overlapping the first or second set of slots.

The foam pig may include least a portion made of a medium density foam or a high density foam. In some embodiments, the foam pig may include a first density foam and a second higher density foam. Each foam portion of the pig is arranged coaxial to the central longitudinal axis of the pig, with the second higher density foam surrounding the first density foam. The first density foam may define a core section of the pig. Other embodiments do not require this kind of lower density core section. The set of slots, including any of the intermediate slots, is located entirely in the second density foam. An outer skin of the foam pig can be a baked, uncoated surface.

The foam pig may be made using a process like that disclosed in U.S. Pat. No. 4,797,239 A, which is incorporated by reference herein, to provide a tough skin surface. In some embodiments, the second density foam is a urethane foam like that used in REDSKIN™ foam pigs (T. D. Williamson, Tulsa, Okla.). The amount of second density foam that can be used and still cure properly may be limited due to such factors as chemical properties, expansion of the foam, and the process of baking the foam. Therefore, the first density foam may serve, in part, as "make-up" foam. The foam pig's core can be altered according to the size of pig so that the amount of second density foam cures properly. For example in a foam pig designed to traverse 17-to-9 sized diameter pipe, the core made of the first density foam makes up about 4.5 lbs [2.04 kg] of the pig's total weight and the second density foam makes up about 47.8 lbs [21.7 kg].

In other embodiments, the foam pig may include a bypass passageway, which may be a stainless steel tube running an entire length of the pig. The pig may also include a reinforcement tube arranged about and coaxial to the bypass flow passageway and extending longitudinally through the core. The reinforcement tube may be polyethylene pipe filled with foam. Additional spacers may be located about the reinforcement tube and placed between adjacent core sections.

In embodiments, the foam pig may be formed using a first split mold and a second split mold that can connect to the first split mold. Standard-length units may be made using the first split mold and long-length units may be made using the first and second split molds when connected together.

Referring to the drawings, embodiments of a long-length unit multi-diameter foam pig 10 includes a first set of radially spaced-apart longitudinally extending slots 11A located toward a nose end 13 of the pig 10 and a second set of radially spaced-apart longitudinally extending slots 11B, aligned with the first set 11A and located toward a tail end 23 of the pig 10. Each set of slots 11A & B ends, respectively, at a circumferential band 15A & B of the pig 10 so that, together, the slots 11A & B do not traverse the entire length L of the pig 10. A standard-length unit version of the foam pig 10 includes only the first set of slots 11A which ends at the first band 15A and does not traverse the entire length L of the pig 10. In this embodiment, the pig 10 includes a first or forward half 14 and a second or rearward half 24.

The band 15 allows a fabrication option of the standard- or long-length unit version with its own back-sealing capability while only having to do minor re-configuring of the mold. In both the standard- and long-length unit versions, the band 15A & B provide sealing. In the long-length unit version, the first (or middle) band 15A provides reinforcement and serves as a dividing point between the two halves 14, 24.

In some embodiments, the band 15 is a solid (slot-free) band. In other embodiments, the band 15 includes a set of radially spaced-apart longitudinally extending intermediate slots 41. These slots 41 are offset from, and spaced between, the slots 11. In long-length unit versions of the foam pig 10, the slots 41A, 41B may extend into the first and second halves 14, 24 of the pig 10 and partially overlap the slots 11. In some embodiments, the slots 41A are longer than the slots 41B. The slots 41 may extend an entire length of a respective band 15 or extend only partially into the band 15.

In embodiments, a width "w" of the slots 11 is wider at a top end 18 of the slot 11 than at the bottom end 19. The slot 11, therefore tapers. In some embodiments the slots 11 are symmetric trapezoidal-shaped in cross-section. In other embodiments, the slots 11 may be triangular prism-shaped in cross-section. At the top end 18, the width w of the slot 11 when fully open is about 60° of arc (decreasing as the slot 11 moves to a fully closed position). For example, a 60 degree arc on a 17-inch [43.18 cm] diameter foam pig 10 equates a width w of about 2 inches to 2½ inches [5.08 cm to 6.35 cm].

In other embodiments, the width w when fully open is in a range of 30° to 45°, 45° to 60°, 50° to 70°, or 60° to 75° of arc. The depth "d" of the slots 11 is such that the slots 11 do not enter into the pig's core 20. The bottom end 19 of the slot 11 may include a radius (e.g. 0.25 inches [0.635 cm]). Regardless of shape, the slots 11 are sized so the pig 10 can move between a first (maximum) diameter D1, a second (smaller) diameter D2, and intermediate diameters between these two diameters D1, D2. At the first diameter D1, the slots 11 are fully open. At the second diameter D2, the slots 11 are fully closed. The pig's 10 open cell foam allows the pig 10 to further reduce to a third (minimum) diameter D3. This diameter D3 occurs when the slots 11 are closed—or in embodiments with slots 41, slots 11 and 41 are closed—and the open cells of the foam are squeezed to a maximum. D3 may be in a range of 0.47 D1 to 0.53 D1. In some embodiments, D3 is 0.5 D1. In other embodiments, D3 is in a range of 0.50 D1 to 0.53 D1. In yet other embodiments, D3 may be in a range of 0.33 D1 to 0.67 D1, there being subranges within this broader range.

The first diameter D1 may be sized for the largest diameter run to be encountered in particular pipeline application and the third diameter D3 may be sized for the smallest diameter run, there being intermediate diameters D2 in between. The different diameter runs encountered by the pig 10 can appear in any order and a same diameter run may appear more than once along the length of the pipeline.

Regardless of the order in which the diameter changes, the outer circumferential body 17 of pig 10, including ring 15, maintains sealing engagement with the pipeline wall and moves forward or backward under the required differential pressure for a given application.

The foam pig 10 may be a medium density foam pig or a high density foam pig. The pig's core 20, which may be arranged as single section or two or more spaced-apart sections, can be a polyurethane, open cell foam or its equivalent and optionally includes a bypass flow passageway 31 coaxial to the central longitudinal axis 33 of the pig. The pig 10 may also include a reinforcement tube 35 arranged coaxial to the bypass flow passageway 31 and extending longitudinally through the core 20. The tube 35 may be polyethylene pipe filled with foam. Additional spacers 37 may be located about the reinforcement tube 35 and placed between adjacent core sections 20. Spacer 37 may also be placed between the core 20 and an end 13, 23 of the pig 10.

The pig 10 may also include a first density foam and a second higher density foam respectively. Both foams may be high density or medium density, or the first foam may be a medium density foam and the second foam a high density foam. In some embodiments, the foam 25 surrounding the core 20 is a polyurethane (or its equivalent) foam having a higher density than that of the core 20.

The pig's outer skin 21 can be formed by the normal curing process of the polyurethane formulation in the mold to create a protective coating. The tail end 23 of the finished foam pig 10 can be inwardly curved or dish-shaped and may be coated with a sealing compound, preferably a solid (non-foam) polyurethane or its equivalent.

Unlike prior art foam pigs which are coated with polyurethane after curing, there is no additional coating of the finished pig body surface (including slots 11). An embodiment of a process used to make the pig 10 "bakes" a thin (about 2 to 3 mm) skin 21 which strengthens the integrity and durability of the pig 10.

While embodiments have been described in detail, a multi-diameter foam pig of this disclosure may be subject to modifications that fall within the scope of this disclosure. Therefore, the following claims are entitled to the full range of equivalents to the recited elements and steps.

What is claimed:

1. A foam pig comprising:

a first set of slots located about a body of the foam pig and having a fully open position and a fully closed position, slots of the first set of slots longitudinally extending and being radially spaced apart from one another;

a first circumferential band located between a nose end and a tail end of the foam pig, the first set of slots located between the nose end of the foam pig and the first circumferential band;

the foam pig having a first diameter D1 when the first set of slots is in a fully open position and a second smaller diameter D2 when the first set of slots is in a fully closed position; and an intermediate set of shorter slots located about the body of the foam pig and having an open position and a closed position, slots of the intermediate set of shorter slots longitudinally extending and radially spaced apart from one another and not aligned with the slots of the first set, the intermediate set of shorter slots partially overlapping those of the first set and extending into the first circumferential band.

2. A foam pig according to claim 1 further comprising slots of the first set of slots tapering from a top end to a bottom end of the slots.

3. A foam pig according to claim 2 further comprising the slots being trapezoidal-shaped in cross-section.

4. A foam pig according to claim 2 further comprising the slots being triangular-shaped in cross-section.

5. A foam pig according to claim 1 further comprising a first density foam and a second higher density foam each arranged coaxial to a central longitudinal axis of the foam pig, the second higher density foam surrounding the first density foam.

6. A foam pig according to claim 5 wherein the first density foam defines at least one core section of the foam pig.

7. A foam pig according to claim 5 wherein the first set of slots is located entirely in the second density foam.

8. A foam pig according to claim 1 wherein a minimum diameter D3 of the foam pig is in a range of 0.47 D1 to 0.53 D1, D2>D3.

9. A foam pig according to claim 1 further comprising an outer skin of the foam pig, the outer skin being a baked, uncoated surface.

10. A foam pig according to claim 1 further comprising a bypass flow passageway arranged coaxial to a central longitudinal axis of the foam pig.

11. A foam pig according to claim 10 further comprising a tube located about the bypass flow passageway and extending at least partially through the at least one core section of the foam pig.

12. A foam pig according to claim 10 further comprising a spacer located about the bypass flow passageway and adjacent to the at least one core section.

13. A foam pig according to claim 1 further comprising at least a portion of the foam pig including a medium density foam.

14. A foam pig according to claim 1 further comprising at least a portion of the foam pig including a high density foam.

15. A foam pig according to claim 1 further comprising:

a second set of slots located about the body of the foam pig and having an open position and a closed position, slots of the second set of slots longitudinally extending and radially spaced apart from one another;

a second circumferential band located toward the tail end of the foam pig, the second set of slots aligned with the first set of slots and located between the first circumferential band and the second circumferential band.

16. A foam pig comprising:

a first and a second set of slots located about a body of the foam pig and having an open position and a closed position, slots of the first set extending longitudinally and being radially spaced-apart from one another;

a first and a second circumferential band located between a nose end and a tail end of the foam pig, the first set of slots located between the nose end of the foam pig and the first circumferential band, the second set slots located between the first circumferential band and the second circumferential ring band;

the foam pig having a first diameter D1 when at least one of the first and second set of slots is in a fully open position and a second smaller diameter D2 when at least one of the first and second set of slots is in a fully closed position.

17. A foam pig according to claim 16 further comprising:

a first and a second set of intermediate shorter slots located about the body of the foam pig and having an open position and a closed position, slots of the first and second set of intermediate shorter slots longitudinally extending and radially spaced apart from one another and not aligned with the slots of the first or second set, the first and second set of intermediate shorter slots partially overlapping those of the first or second set and extending at least partially into the first or second circumferential band, respectively.

18. A foam pig comprising:

a body including a baked, uncoated outer skin and containing a bypass passageway, a first density foam, and a second higher density foam each arranged coaxial to a central longitudinal axis of the foam pig, the second higher density foam surrounding the first density foam, the first density foam defining at least one core section of the foam pig;

a reinforcement tube located about the bypass flow passageway;

a first and a second set of slots located about the body and having an open position and a closed position, slots of the first and second set of slots extending longitudinally and being radially spaced-apart from one another, each slot of the first and second set of slots tapering from a top end to a bottom end of the slot;

a first and a second circumferential band located between a nose end and a tail end of the foam pig, the first set of slots located between the nose end of the foam pig and the first circumferential band, the second set of slots located between the first circumferential band and the second circumferential band;

a first and a second set of shorter slots located about the body and having an open position and a closed position, slots of the first and second set of shorter slots located at least partially on the first and second circumferential bands, respectively, and offset in a circumferential direction from those of the first and second set of slots, each slot of the first and second set of shorter slots tapering from a top end to a bottom end of the slot.

19. A foam pig according to claim 1 further comprising at least one spacer arranged about the bypass flow passageway and immediately adjacent to the at least one core section.

* * * * *